July 14, 1925.

J. WOLK 1,545,628

AUTOMATIC LUBRICATOR FOR UNIVERSAL JOINTS

Filed March 27, 1924

Inventor
J. Wolk

By F. K. Bryant
Attorney

Patented July 14, 1925.

1,545,628

UNITED STATES PATENT OFFICE.

JOSEPH WOLK, OF BRIDGEPORT, CONNECTICUT.

AUTOMATIC LUBRICATOR FOR UNIVERSAL JOINTS.

Application filed March 27, 1924. Serial No. 702,326.

*To all whom it may concern:*

Be it known that I, JOSEPH WOLK, a citizen of Poland, residing at Bridgeport, in the county of Fairfield and State of Connecticut, have invented certain new and useful Improvements in Automatic Lubricators for Universal Joints, of which the following is a specification.

This invention relates to new and useful improvements in automatic lubricators for universal joints.

An important object of the invention is to provide means for maintaining a substantially constant circulation of a lubricant through the universal joints provided in the drive shaft which connects the power plant and the rear axle of an automobile.

A further object of the invention is to employ the natural characteristics of such a drive shaft for producing the power required to maintain the lubricant in circulation.

Other objects and advantages of the invention will be apparent during the course of the following description.

Figure 4:
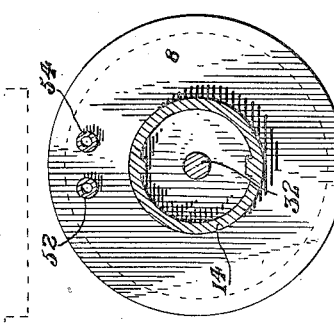
Figure 1:
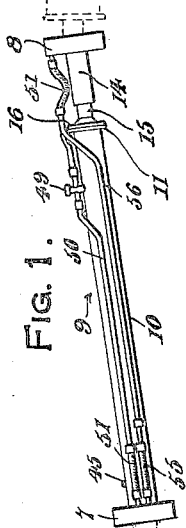
Figure 2:
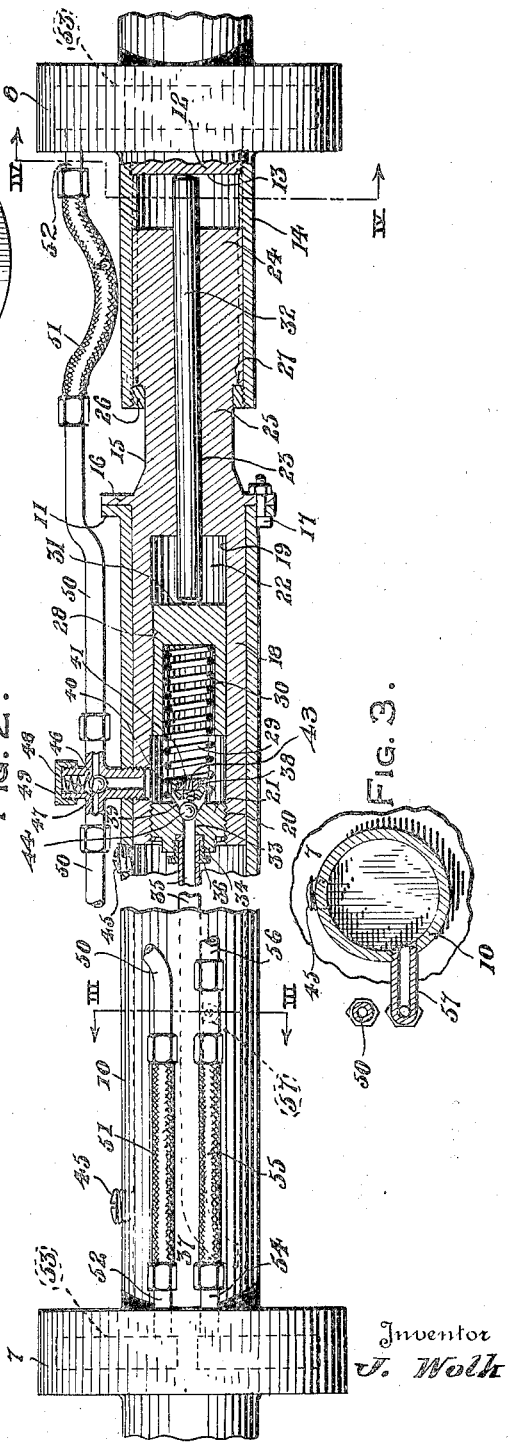
Figure 3:
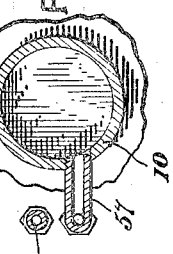

In the accompanying drawing forming a part of this specification and in which like numerals are employed to designate like parts throughout the same, Figure 1 is a side elevational view of the automatic lubricating device embodying this invention shown in operative relation with a portion of the driving mechanism of an automobile, Figure 2 is an enlarged detail view, partly in section, partly in elevation, and partly broken away of the automatic lubricator illustrated in Fig. 1, Figure 3 is a transverse sectional view taken upon line III—III of Fig. 2, and Figure 4 is a transverse sectional view taken upon line IV—IV of Fig. 2.

It is well known, to those skilled in the motor vehicle art, that a universal joint is an indispensable part of a drive shaft of the type which transmits power from one member carried by the chassis frame to the gearing at the rear axle because the movement of the rear axle is independent of that of the frame which is supported by resilient, yielding springs. It is, also, well known that the free movement of the rear axle in respect to the frame causes a substantially regular lengthening and shortening of the distance between the rear axle and the drive connecting end of the crank shaft of the power plant. This condition is usually taken care of by the construction of the drive shaft or the manner of connecting the same to its cooperating elements.

This lengthening and shortening of the distance between the rear axle and the power plant is the condition made use of in this invention for producing the automatic means required to cause the circulation of the lubricating medium through the universal joint above referred to.

In the drawing, wherein for the purpose of illustration is shown a preferred embodiment of this invention, the numeral 5 designates the transmission of an automobile while the numeral 6 designates in general the differential. Located between the adjacent portions of the transmission and differential are the universal joints 7 and 8 which are connected by the drive shaft which is designated in general by the numeral 9.

It is to be understood that the showings of the universal joints 7 and 8 are not intended to illustrate any particular form of universal joint nor is it intended to illustrate structure that would be sufficient for producing the type of joint referred to. It is merely intended to illustrate the location of universal joints in an automobile driving means and the arrangement of the same in respect to the automatic lubricating device embodying this invention.

In Fig. 2 there is illustrated in detail a tubular casing 10 which is intended to be connected to the universal joint 7 in a suitable manner for permitting the joint to perform its desired function. The free end of this tubular casing 10 is provided with an annular, outwardly directed flange 11 which is provided for a purpose to be described at a later point.

The universal joint 8 has a projection 12 which is externally screw threaded, as at 13 for permitting the connecting thereto of the relatively short tubular casing section 14. It is to be understood that the projection 12 is connected to the universal joint 8 in such a manner that this joint may perform its desired function.

A coupler 15 is illustrated in Fig. 2 as having its opposite ends projecting into the bores of the tubular casings 10 and 14. This coupler 15 is provided, at a point substantially midway of its length, with an annular, outwardly directed flange 16 which is connected to the flange 11 by a plurality of bolts or the like 17. It will be seen that these bolts will retain the cylindrical portion 18 of the coupler within the bore of the tubular casing 10 and immovable in respect to said casing. This cylindrical portion 18 is provided with a bore 19 which is internally screw-threaded at its outer end 20 for receiving the plug 21. This bore 19 will be referred to hereafter as the pump chamber 22.

The remaining portion of the coupler 15 is provided with a reduced bore 23 which extends from the inner end of the pump chamber 22 to the outer end of the coupler 15. This last referred to end of the coupler 15 is provided with an enlarged head portion 24 which is of solid formation with the exception of the bore 23. The head portion 24 is connected to the cylindrical portion 18 by the neck portion 25. For the purpose of retaining the head portion 24 within the bore of the tubular casing 14 and for permitting the said head to reciprocate therein, the outer end of the tubular casing 14 is internally screw threaded for receiving the annular stop ring 26 which is threadedly connected thereto. It will be seen that the head portion 24 is provided with a shoulder 27 which is adapted for engaging the stop ring 26 when the head portion 24 is in the position illustrated in Fig. 2.

Positioned within the pump chamber 22 is a cup-shaped pump piston 28 having a compression spring 29 extending into the bore 30 thereof. This compression spring 29 is intended to bear against the plug 21 which is adjustably connected to the outer end of the cylindrical portion 18. The cup-shaped pump piston 28 is illustrated in Fig. 2 as being located at a position wherein the compression spring 29 is exerting no pressure thereagainst. Engaging the outer end face 31 of the cup-shaped pump piston 28 is a push rod 32 which extends through the reduced bore 23 of the coupler 15 and projects from the head portion 24 for the purpose of engaging the projection 12 associated with the universal joint 8.

The structure so far referred to is capable of producing an automatic pumping action when the distance covered by the drive shaft 9 is shortened and lengthened. The shortening of this drive shaft will cause the head portion 24 of the coupler 15 to be moved a greater distance into the bore of the tubular casing 14 than the position in which it is illustrated in Fig. 2. This moving of the head portion into the bore of the tubular casing 14 will cause the push rod 32 to move longitudinally through the reduced bore 23 of the coupler 15. This movement of the push rod 32 will cause the cup-shaped pump piston 28 to move longitudinally through the pump chamber 22 against the pressure of the compression spring 29. This movement of the cup-shaped pump piston 28 is intended to produce one stroke of a pumping action. As the drive shaft 9 lengthens, the head portion 24 will travel through the bore of the tubular casing 14 in the opposite direction or in a direction away from the projection 12 of the universal joint 8. The compression spring 29 will then be permitted to force the cup-shaped pump piston 28 and the push rod 32 longitudinally of the pump chamber 22 and the reduced bore 23 respectively for returning the same to the positions illustrated in Fig. 2. This return movement of the pump piston 28 is intended to produce the final stroke of the pumping action. The adjustable plug 21 threadedly connected to the end of the cylindrical portion 18 of the coupler 15 is provided with a bore 33 which increases in diameter for forming the pocket 34 within which the flanged end of the lubricant pipe 35 is secured by means of the tubular nut or clamping collar 36. This feed pipe is formed of a sufficient length to extend longitudinally through the bore of the tubular casing 10 and terminates in proximity to the universal joint 7 and is of arcuate formation, as at 37. The opposite end of the plug 21 is provided with a boss 38 which has a plurality of diverging passageways 39 formed therein which communicate with the bore 33 formed in the said plug. The boss 38 is further provided with a pocket 40 within which a ring 41 is threadedly secured and is employed for adjusting the pressure applied to the spring 43 which engages the ball valve 44 that is intended to act as a one-way valve for controlling the passage of lubricant through the feed pipe 35. It will be seen by this construction that the one-way ball valve 44 will be unseated when the cup-shaped pump piston 28 moves away from the plug 21 and that the ball valve will be seated when the piston moves toward the said plug.

It will be noted that the end of the compression spring 29 which bears against the plug 21 will be retained in a concentric position in respect to the plug by the boss 38 which it encircles.

In Figs. 1, 2 and 3 it will be noticed that the tubular casing 10 is provided with removable filler plugs 45 by means of which a lubricant may be placed within the bore of its tubular casing 10. For this reason, the bore of the tubular casing 10 will be hereafter referred to as the lubricant chamber. It is to be understood that the inclination of the drive shaft 9, as illustrated in Fig. 1, will better adapt the filler plug 45 located in proximity to the end of the cylindrical portion 18 of the coupler 15 to be utilized for the filling of the lubricant chamber while the filler plug 45 located in proximity to the universal joint 7 will be adapted for being employed to remove the lubricant from the chamber.

In Fig. 2 there is illustrated a four-way connector 46 which is threadedly secured within a passageway which extends through the tubular casing 10 and through the cylindrical portion 18 of the coupler 15 for communicating with the end of the pump chamber 22 which is provided with the plug 21. This four-way connector 45 is provided with a one-way closing valve which is of the ball type and is retained upon its seat by means of the spring 48 which is retained in position by the removable cap 49. Connected to the remaining two passageways of the four-way connector 46 are the lubricant feed pipes 50 which are employed for conveying the lubricant from the pump chamber 22 to the universal joints 7 and 8. These feed pipes 50 are connected by the flexible tubes 51 to the nipples 52 which communicate with the interior 53 of the universal joints 7 and 8. There are also provided nipples 54 which communicate with the interior 53 of the universal joints 7 and 8 and these nipples 54 are connected by the flexible tubing 55 with the lubricant return pipe 56. This lubricant return pipe 56 is provided with a branch pipe 57 which communicates with the interior of the lubricant chamber formed in the tubular casing 10. It is now believed that the construction and operation of the various elements embodying this invention will be understood from the above detail description. It might be well to again call attention to the complete circulation of lubricant from the chamber within the casing 10, through the universal joints 7 and 8, and back again to the said lubricant chamber. It will be noted that when the cup-shaped piston 28 moves toward the plug 21 that lubricant within the pump chamber 22 between the piston 28 and the plug 21 will be forced outwardly past the ball valve 47 into the feed pipes 50 from which the lubricant will pass into the universal joints 7 and 8. After the drive shaft 9 again lengthens, the cup-shaped pump piston will be forced away from the plug 21 by the compression spring 29 for drawing lubricant from the chamber formed within the tubular casing 10 into the pump chamber 22 by the one-way ball valve 44. The forcing of lubricant into the universal joints 7 and 8 will cause the lubricant previously deposited therein to be forced therefrom into the return pipe 56 which will convey the same to the lubricant chamber formed in the tubular casing 10. It is now believed that the complete circulation of the lubricant has been clearly disclosed.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a lubricating apparatus, the combination with an extensible drive shaft which is caused to vary in length during operation, of a lubricant conveyor system, and means for utilizing the variations in the length of the drive shaft for pumping lubricant through said system.

2. In a lubricating apparatus, the combination with an extensible drive shaft which is caused to vary in length during operation, of a lubricant system including a reservoir, and a conveyor pipe, and means for utilizing the variations in length of said drive shaft for forcing lubricant from said reservoir through said pipe.

3. In a lubricating apparatus, the combination with an extensible drive shaft which is caused to vary in length during operation, of a lubricant system including a reservoir and a series of conveyor pipes, a reciprocating pump and means for utilizing the variations in length of said drive shaft for operating said pump to cause a circulation of lubricant from said reservoir through said series of conveyor pipes and back to said reservoir.

4. In a lubricating apparatus, the combination with an extensible drive shaft incorporated into the power system of a motor vehicle, whereby the travel of the vehicle over irregular ground will cause said shaft to vary in length, of a lubricant conveyor system and means for utilizing the variations in length of said drive shaft for forcing lubricant through said system.

5. In a lubricating apparatus, the combination with an extensible drive shaft incorporated into the power system of a motor vehicle, whereby the travel of the vehicle over an irregular surface will cause said shaft to vary in length, of a lubricant system including a reservoir and a conveyor pipe, and means for utilizing the variations in length of said drive shaft for forcing lubricant from said reservoir through said conveyor pipe.

6. In a lubricating apparatus, the combination with an extensible drive shaft incorporated into the power system of a motor vehicle, whereby the travel of the vehicle over an irregular surface will cause said shaft to vary in length, of a lubricant conveyor system, a fluid pump structure, and means for utilizing the variations in length of said drive shaft for operating said pump structure for forcing lubricant through said system.

7. In a lubricating apparatus, the combination with an extensible drive shaft incorporated into the power system of a motor vehicle, whereby the travel of the vehicle over an irregular surface will cause said shaft to vary in length, of a lubricant conveyor system, a fluid pump structure carried by said drive shaft, and means for utilizing the variations in length of said drive shaft for operating said pump structure for forcing lubricant through said system.

8. In a lubricating apparatus, the combination with an extensible drive shaft incorporated into the power system of a motor vehicle, whereby the travel of the vehicle over an irregular surface will cause said shaft to vary in length, of a lubricant conveyor system, a fluid pump structure, means for utilizing the variations in length of said drive shaft for operating said pump structure for forcing lubricant through said system, and means for causing the flow of lubricant to be maintained in one direction through said conveyor system.

9. In a lubricating apparatus, the combination with an extensible drive shaft incorporated into the power system of a motor vehicle, whereby the travel of the vehicle over an irregular surface will cause said shaft to vary in length, of a lubricant conveyor system, a fluid pump structure, and means for utilizing the variations in length of said drive shaft for operating said pump structure for forcing lubricant through said system, and valve elements for causing the flow of lubricant to be maintained in one direction.

10. In a lubricating apparatus, the combination with the extensible drive shaft of a motor vehicle having universal joints mounted thereon, said drive shaft being caused to vary in length during the travel of the vehicle over an irregular surface, of a lubricant reservoir, a conveyor system connecting said reservoir with said universal joints, a pump in said system, and means for causing variations in the length of said drive shaft to operate said pump.

In testimony whereof I affix my signature.

JOSEPH WOLK.